US012542042B2

(12) United States Patent
Gruber

(10) Patent No.: US 12,542,042 B2
(45) Date of Patent: Feb. 3, 2026

(54) METHOD AND APPARATUS FOR ENROLLING MULTI-CONTACT SECURITY SENSORS

(71) Applicant: Universal Electronics Inc., Scottsdale, AZ (US)

(72) Inventor: Brandon Gruber, San Marcos, CA (US)

(73) Assignee: Universal Electronics Inc., Scottsdale, AZ (US)

( * ) Notice: Subject to any disclaimer, the term of this patent is extended or adjusted under 35 U.S.C. 154(b) by 64 days.

(21) Appl. No.: 18/423,458

(22) Filed: Jan. 26, 2024

(65) Prior Publication Data

US 2025/0246057 A1 Jul. 31, 2025

(51) Int. Cl.
*G08B 19/00* (2006.01)
*G08B 25/00* (2006.01)
*G08B 25/01* (2006.01)

(52) U.S. Cl.
CPC ........... *G08B 19/00* (2013.01); *G08B 25/007* (2013.01); *G08B 25/016* (2013.01); *G08B 25/00* (2013.01)

(58) Field of Classification Search
CPC ......... H04W 4/00; H04W 4/02; H04W 4/027; H04W 4/14; H04W 4/38; H04W 4/70; A01M 23/16; G08B 19/00; G08B 25/00; G08B 25/007; G08B 25/01; G08B 25/016; A61B 5/00; A61B 5/0022; A61B 5/4851; A61F 2/30; A61F 2/34; A61F 2/36; B60R 3/02
See application file for complete search history.

(56) References Cited

U.S. PATENT DOCUMENTS

| | | | | |
|---|---|---|---|---|
| 6,624,750 | B1 | 9/2003 | Marman | |
| 2004/0178889 | A1* | 9/2004 | Buckingham | H04L 12/2816 700/291 |
| 2011/0095882 | A1 | 4/2011 | Bell | |
| 2016/0029952 | A1* | 2/2016 | Hunter | A61F 2/34 600/595 |
| 2016/0344852 | A1 | 11/2016 | Bergman | |
| 2021/0169392 | A1* | 6/2021 | Albert | A61B 5/28 |
| 2023/0145708 | A1 | 5/2023 | Gruber | |
| 2023/0266936 | A1 | 8/2023 | Saldin | |

OTHER PUBLICATIONS

International Search Report and Written Opinion of international application No. PCT/US25/12915, dated Apr. 5, 2025, 10 pp.

* cited by examiner

*Primary Examiner* — Van T Trieu
(74) *Attorney, Agent, or Firm* — Greenberg Traurig, LLP

(57) ABSTRACT

An improved multi-contact security sensor is described. The improved multi-contact security sensor transmits information indicating a number of sensors associated with the multi-contact security sensor. Each sensor is represented by a status bit in an enrollment message transmitted by the multi-contact security sensor.

6 Claims, 9 Drawing Sheets

METHOD AND APPARATUS FOR ENROLLING MULTI-CONTACT SECURITY SENSORS

BACKGROUND

I. Field of Use

The present application relates to the field of home security. More specifically, the present application relates to an improved multi-contact security sensor.

II. Description of the Related Art

Security systems for homes and businesses have been around for many years. Installation of these systems typically requires physically mounting a number of door and window sensors to doors and windows of a structure, plus one or more motion sensors to monitor for movement in desired locations. System setup usually involves learning, or enrolling, of the various sensors into the security panel, hub or gateway located within the structure. This typically involves placing the security panel, hub or gateway into a "learn mode" or an "enrollment mode" of operation, then manipulating the sensors so that they transmit a wireless signal indictive of the presence of the sensor. For example, many sensors are shipped from the factory with a thin strip of non-conductive material, such as mylar or plastic, extending from a battery compartment, preventing a battery inside from contacting one of the battery contacts in a battery compartment. When the strip is removed, the sensor is energized and programmed to transmit one or more messages, such as a "learn" packet, node ID, or simply a serial number of the sensor. When the transmission(s) is/are received by the security panel, hub or gateway, the sensor is enrolled into the system, meaning that the system will respond to future signals transmitted by each sensor.

Multi-contact sensors, otherwise known as external contact sensors, are door or window sensors that have a traditional contact sensor internally, plus a port that allows an external sensor to be added. External contact sensors are used in applications where, for example, thick door jams are present. The external sensor is connected to the port via a wire, and then the external sensor determines whether a door or window has been opened as it senses a magnetic field produced by a magnet attached to a door jamb or a window casing.

Enrolling such multi-contact sensors can prove to be challenging, however. Typically, a user must initiate a complicated process, triggering either the internal sensor or the external sensor as the sensor is being enrolled. The process is so complex, that an installer generally must access and read a set of instructions in order to successfully enroll the sensor. Many times, installers don't bother to read the instructions, and the sensor is enrolled incorrectly.

It would be desirable to provide a multi-contact sensor that is easy to install without having to read a set of instructions.

SUMMARY

The embodiments described herein relate to methods, systems, and apparatus associated with a multi-contact security sensor. In one embodiment, a multi-contact sensor comprises an internal sensor, an external communication port, a removable, external sensor coupled to the external communication port, a transmitter, a non-transient memory for storing processor-executable instructions and a processor, coupled to the internal sensor, the external communication port, the transmitter and the memory, for executing the processor-executable instructions that cause processor to, in response to a predetermined event, form an enrollment message comprising a first status bit corresponding to the internal sensor and a second status bit corresponding to the external contact sensor, and transmit the enrollment message to a local security monitoring station for processing.

In another embodiment, a method is described, performed by a multi-contact security sensor, comprising, in response to a predetermined event, forming an enrollment message comprising a first status bit corresponding to an internal sensor of the multi-contact sensor and a second status bit corresponding to an external contact sensor coupled to the multi-contact sensor via an external communication port of the multi-contact sensor, and transmitting the enrollment message to a local security monitor for processing.

BRIEF DESCRIPTION OF THE DRAWINGS

The features, advantages, and objects of the present invention will become more apparent from the detailed description as set forth below, when taken in conjunction with the drawings in which like referenced characters identify correspondingly throughout, and wherein.

DETAILED DESCRIPTION

The present application relates to an improved multi-contact security sensor, comprising at least one internal sensor and at least one external sensor, for use in security systems. The improved multi-contact security sensor as described herein is configured for easy enrollment into a security system, without having to reference an installation manual. After installation, a user can tell which sensor was triggered/faulted/changed (i.e., external vs. internal) without having to explicitly configure a security system or an app to do this.

Figure 1:
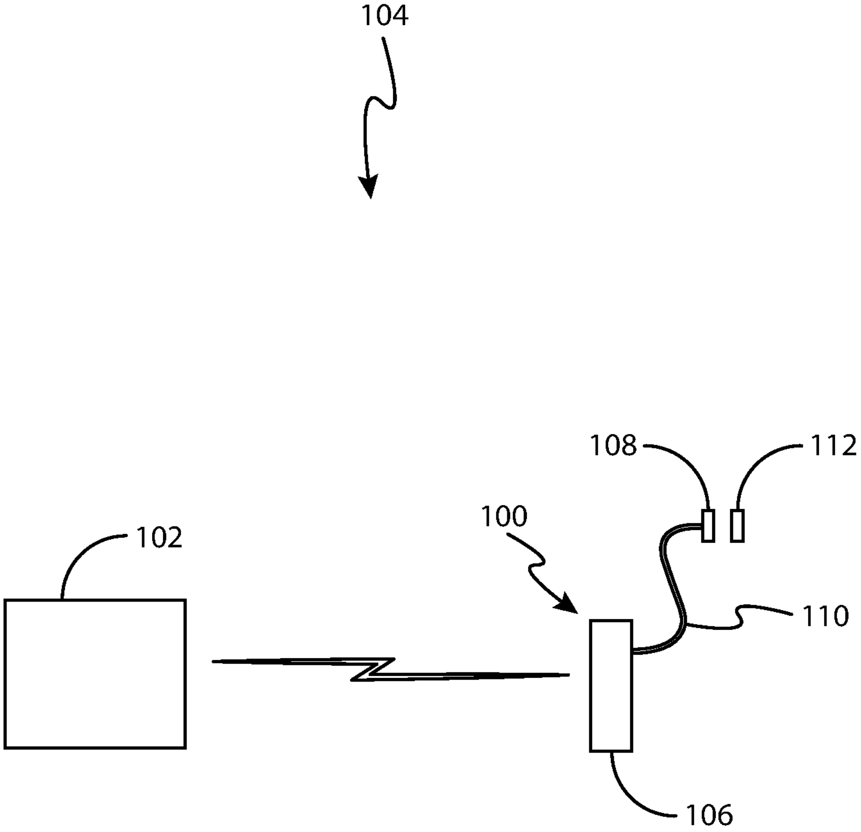
FIG. 1 is a block diagram of an improved multi-contact security sensor in communication with a local security monitoring station.

FIG. 1 is a block diagram of an improved multi-contact security sensor 100 in communication with a local security monitoring station 102. Multi-contact security sensor 100 comprises a wireless security sensor for monitoring entry barriers, such as doors or windows, used in conjunction with local security monitoring station 102 to form a security system 104. Multi-contact security sensor 100 comprises an internal sensor located inside housing 106 and a removable, external sensor 108 coupled to housing 106 via a signal wire 110 coupled to a mechanical and electrical port on housing 106 that electrically couples external sensor 108 to a processor inside housing 106. Typically, the internal sensor and external sensor 108 are the same type of sensor, for example, a reed switch commonly used in the security industry for many decades. The reed switch changes state when magnet 112 is in close proximity to the reed switch. The internal sensor and external sensor 108 may be referred to herein as "sub-sensors" to differentiate them from the overall multi-contact security sensor 100. This allows the reed switch to determine when a barrier has been moved, i.e., when a door or a window has been opened or closed as magnet 112 moves away from housing 106 when it is located on a movable portion of a door or window. It should be understood that reed switches are commonly referred to as "contacts" or "contact sensors". However, it should be understood that the internal sensor and external sensor 108 may each comprise a different kind of sensor, such as an infra-red or ultrasonic sensor, a Hall Effect sensor, an accelerometer, a gyro sensor, etc.

While only a single sensor is shown in FIG. 1, in practice, security system 104 typically comprises a plurality of different types of sensors. For example, security system 104 may comprise ten door/window sensors, three motion detectors, two garage door sensors, and multi-contact security sensor 100. Security system 104 in FIG. 1 shows only 104 purposes of clarity.

Multi-contact security sensor 100 may be configured with or without external sensor 108. When used without external 108, housing 106 is typically affixed to a door or window frame and magnet 112 is secured to a movable portion of a door or window. When used with external sensor 108, for example, in applications where a doorframe is unusually wide or thick, housing is typically affixed near a door or a window for example, on a door or window frame, wall, etc., External sensor 108 is affixed on a door or a window frame close to a movable portion of the door or window, and magnet 112 is affixed to the door or window such that it is in close proximity with housing 106 when the door or window is closed. External sensor 108 is then mechanically and electronically coupled to housing 106 via signal wire 110. When the door or window is open, external sensor 108 changes state and a processor within housing 106 detects this change and, in response, transmits a signal to local security monitoring station 102, indicating that the door or window has been opened.

It should be understood that while external sensor 108 is discussed herein primarily as a contact sensor, i.e., a reed switch, in other embodiments, external sensor 108 may utilize other technologies detect whether a door or a window has been opened or closed. For example, external sensor 108 may utilize ultrasonic or infrared technology or detect acceleration, vibration, orientation, vibration of a door or window in order to determine whether and/or closed. It should also be understood that although multi-contact security sensor 100 is shown in FIG. 1 as comprising a single external sensor 108, in other embodiments, it could comprise two or more external sensors 108, each coupled to housing 106 via an independent, respective electrical/mechanical port.

Local security monitoring station 102 comprises a wireless receiver that receives signals from each sensor in security system 104. Local security monitoring station 102 comprises a hub, gateway, security panel, or the like. Local security monitoring station 102 is typically in communication with remote locations, such as a remote security monitoring center and one or more personal communication devices, i.e., smart phones, in order to alert external entities when a triggering event has occurred, such as when a door is opened while security system 104 is in an armed state. Typically, local security monitoring station 102 is in communication with such external entities via the Internet and/or cellular networks.

When multi-contact security sensor 100 is first installed into security system 104, it typically must be "learned in" or enrolled with local security monitoring station 102 so that local security monitoring station 102 recognizes multi-contact security sensor 100 as a valid device in security system 104. Enrollment may comprise setting local security monitoring station 102 into a learn mode of operation and then manipulating multi-contact security sensor 100 in some way, for example, installing a battery into multi-contact security sensor 100, removing a plastic tab that activates circuitry within multi-contact security sensor 100 for the first time, or exercising the internal sensor and/or external sensor 108 with magnet 112. However, since multi-contact security sensor 100 comprises multiple sensors, it has heretofor been challenging to enroll such multi-contact sensors. Multi-contact security sensor 100 solves this problem by, in one embodiment, transmitting a wireless "enrollment message" upon the occurrence of a pre-determined event, such as power-up of circuitry within housing 106. The enrollment message comprises a digital packet of information, the packet comprising a first status bit representing a state of the internal sensor and a second status bit representing a state of external sensor 108. In one embodiment, a user holds magnet 112 close to either housing 106 or external sensor 108 prior to transmission of the enrollment message so that the status bit representing the particular sensor, i.e. internal or external, is set, communicating to local security monitoring station 102 which sensor will be used to monitor a door or a window. In another embodiment, the user does not need to use magnet 112. In this environment, once the circuitry inside housing 106 is activated, the enrollment message is transmitted, comprising, again, one status bit representing external sensor 108 and one status bit representing the internal sensor. The enrollment message is received by local security monitoring station 102 and, in one embodiment, recognizes that the enrollment message originates from a multi-contact sensor by determining that the enrollment message comprises more than one status bit representing a status of a door or a window. Local security monitoring station 102 then adds multi-contact security sensor 100 as an enrolled sensor by storing information contained in the enrollment message in a memory coupled to the processor. Thereafter, when local security monitoring station 102 receives an event message, i.e., an alarm signal, from multi-contact security sensor 100 (i.e., when a door or a window monitored by multi-contact security sensor 100 is opened), the processor may inspect both status bits to determine whether the internal sensor was triggered or the external sensor.

Figure 2:
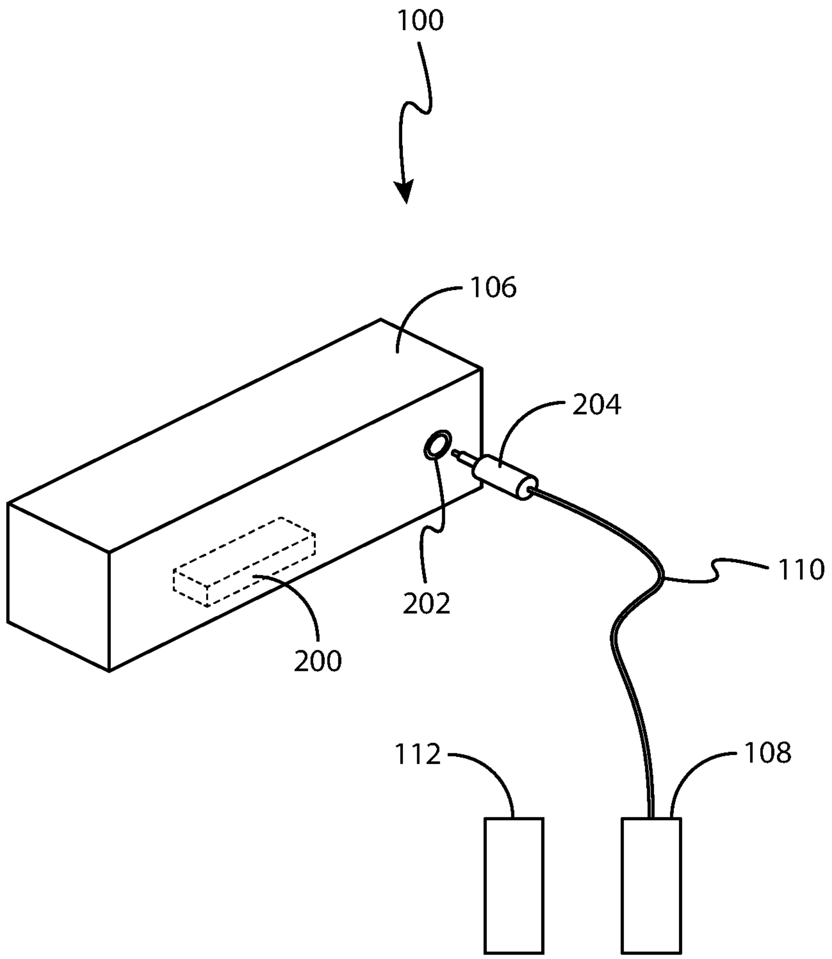
FIG. 2 is a perspective view illustrating the multi-contact security sensor as shown in FIG. 1 comprising a housing and an external sensor coupled to the housing via a signal wire.

FIG. 2 is a perspective view illustrating multi-contact security sensor 100, comprising housing 106 and external sensor 108 mechanically coupled to housing 106 via signal wire 110 and electrically coupled to a processor within housing 106. In some embodiments, external sensor 108 is removably coupled to housing 106 via port 202 located on a surface of housing 106. In this embodiment, signal wire 110 comprises a connector, often in the form of a common "jack", that mates with port 202. Also shown is internal sensor 200 inside housing 106.

Figure 3:
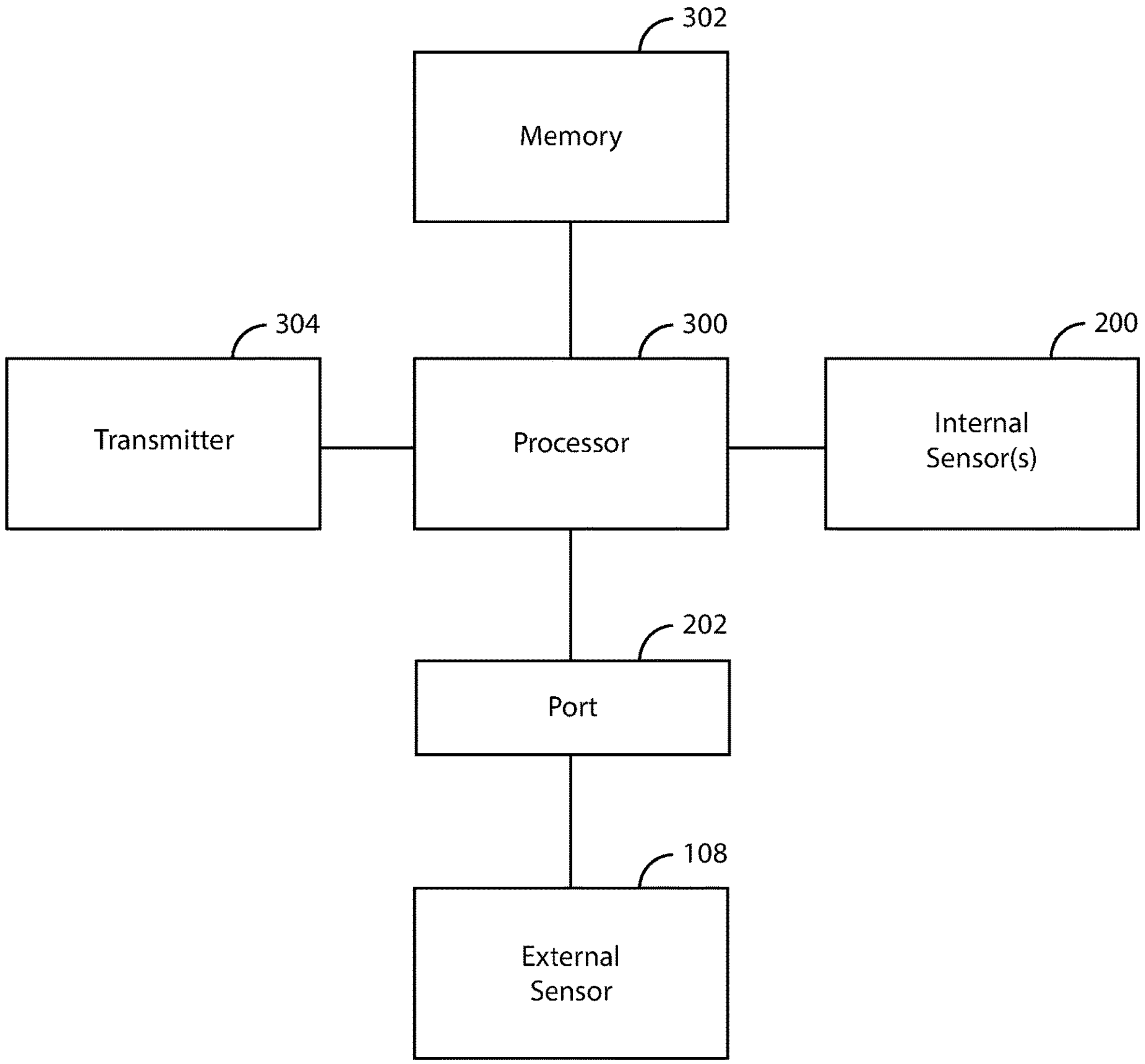
FIG. 3 is a functional block diagram of one embodiment of multi-contact security sensor.

FIG. 3 is a functional block diagram of one embodiment of multi-contact security sensor 100 in accordance with the teachings herein. Specifically, FIG. 3 shows processor 300, memory 302, transmitter 304, transmitter 304, internal sensor(s) 200, port 202 and external sensor 108. It should be understood that the functional blocks may be coupled to one another in a variety of ways, and that not all functional blocks necessary for operation of the barrier alarm device are shown (such as a power supply), for purposes of clarity.

Processor 300 controls general operations of multi-contact security sensor 100 by executing processor-executable instructions stored in memory 302, for example, executable binary code. Processor 300 may comprise one or more general or specific-purpose microprocessors, microcomputers, microcontrollers and/or ASICs. A general-purpose processor becomes a specialized processor when it executes the processor-executable instructions. Generally, processor 300 is selected based on factors such as power consumption, memory requirements and cost.

Memory 302 is coupled to processor 300, comprising one or more information storage devices, such as RAM, ROM, flash memory, or other type of electronic, optical, or mechanical memory device(s). Memory 302 is used to store processor-executable instructions for operation of multi-contact security sensor 100 as well as any information used by processor 300, such as identification information, current or previous door or window status information, etc. Memory 302 excludes transitory propagating signals. In some embodiments, memory 302 is integrated with processor 300, for example, in the case of many microcontrollers on the market today.

Internal sensor 200 is coupled to processor 300 and monitors a state, physical condition, attribute, status, or parameter of a barrier, such as a door or a window. Internal sensor 200 may comprise a reed switch, ultrasonic transducer/receiver, an infrared transmitter/receiver, an RFID receiver, a tilt sensor, an accelerometer, a gyroscope, a motion sensor, or some other device to determine whether a barrier has moved, i.e., from a closed position to an open position or vice-versa.

Transmitter 304 is coupled to processor 300, comprising circuitry necessary to wirelessly transmit messages and/or other information from multi-contact security sensor 100 to local security monitoring station 102, including enrollment messages and event messages. Event messages may comprise alarm signals (i.e., when a door or window is opened or closed), low-battery messages, supervisory messages, etc. Such circuitry is well known in the art and may comprise BlueTooth, Wi-Fi, RF, optical, ultrasonic circuitry, among others. In some embodiments, transmitter 304 may additionally comprise well-known circuitry to receive wireless signals from local security monitoring station 102. In this case, transmitter 304 may comprise a transceiver.

Figure 9:
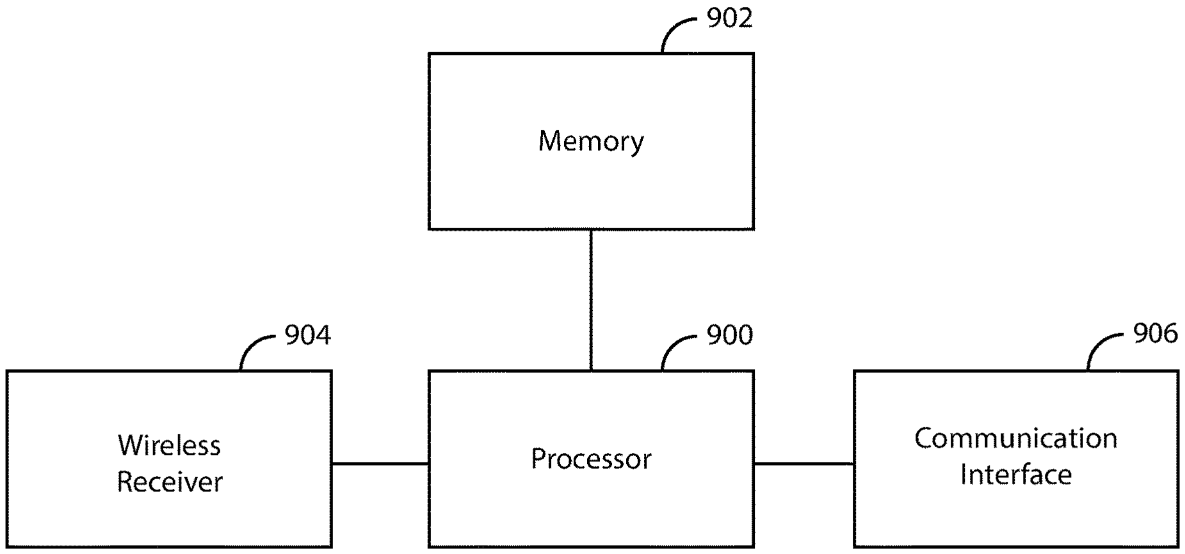
FIG. 9 is a functional block diagram of one embodiment of the local security monitoring station as shown in FIG. 1 in accordance with the teachings herein.

FIG. 9 is a functional block diagram of one embodiment of local security monitoring station 102 in accordance with the teachings herein. Specifically, FIG. 9 shows processor 900, memory 902, wireless receiver 904, and communication interface 906. It should be understood that the functional blocks may be coupled to one another in a variety of ways, and that not all functional blocks necessary for operation of local security monitoring station 102 are shown (such as a power supply), for purposes of clarity.

Processor 900 controls general operations of local security monitoring station 102 by executing processor-executable instructions stored in memory 902, for example, executable binary code. Processor 900 may comprise one or more general or specific-purpose microprocessors, microcomputers, microcontrollers and/or ASICs. A general-purpose processor becomes a specialized processor when it executes the processor-executable instructions. Generally, processor 900 is selected based on factors such as processing capability, memory requirements and cost.

Memory 902 is coupled to processor 900, comprising one or more information storage devices, such as RAM, ROM, flash memory, or other type of electronic, optical, or mechanical memory device(s). Memory 902 is used to store processor-executable instructions for operation of multi-contact security sensor 100 as well as any information used by processor 900, such as identification information, current or previous door or window status information, etc. Memory 902 excludes transitory propagating signals. In some embodiments, memory 902 is integrated with processor 900, for example, in the case of many microcontrollers on the market today.

Wireless receiver 904 is coupled to processor 900, comprising circuitry necessary to receive wireless status messages, enrollment messages, event messages and/or other information from multi-contact security sensor 100 and other security sensors in security system 104. Such circuitry is well known in the art and may comprise Bluetooth, Wi-Fi, RF, optical, ultrasonic circuitry, among others. In some embodiments, wireless receiver 904 may additionally comprise well-known circuitry to transmit wireless signals from local security monitoring station 102. In this case, wireless receiver 904 may comprise a transceiver.

Communication interface 906 is coupled to processor 900, comprising circuitry necessary to communicate with external devices, such as smart phones, a remote monitoring center, etc. via one or more communication methods, such as via POTS telephone service, cellular service, the Internet, etc. Such circuitry is well known in the art. Processor 900 utilizes communication interface 906 to send and receive information to such external devices, for example, event messages, status signals of one or more of the security sensors in security system 104, and overall status of security system 104, etc.

Figure 4:
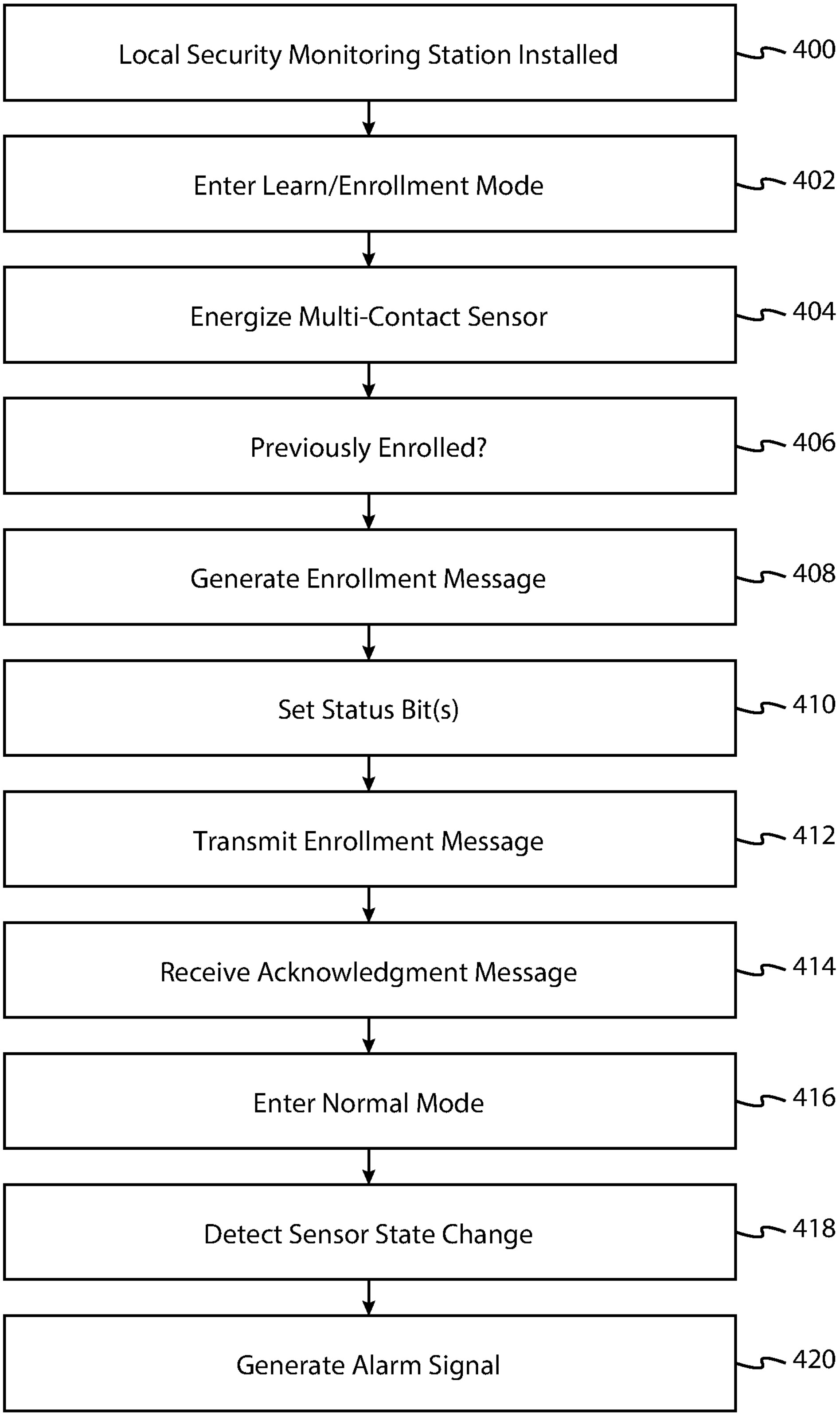
FIG. 4 is a flow diagram illustrating one embodiment of a method performed by the multi-contact security sensor as shown in FIGS. 1 and 2.

FIG. 4 is a flow diagram illustrating one embodiment of a method performed by multi-contact security sensor 100. It should be understood that in some embodiments, not all of the steps shown in FIG. 4 are performed. It should also be understood that the order in which the steps are carried out may be different in other embodiments.

At step 400, local security monitoring station 102 has been previously installed and set up within a premises, such as a home or a business. local security monitoring station 102 is configured to receive wireless event messages and enrollment messages from a plurality of sensors that, together with one or two, constitute security system 104.

At step 402, a user places local security monitoring station 102 into a "learn mode" or "enrollment mode", in order to introduce a new security sensor, such as multi-contact security sensor 100. Placing one or two into a learn/enrollment mode is well known in the art.

At step 404, the user energizes multi-contact security sensor 100, typically by inserting a battery or pulling a tab that connects an already-installed battery inside housing 106 to the circuitry of multi-contact security sensor 100.

At step 406, in response to being energized, processor 300 may determine whether multi-contact security sensor 100 has been previously enrolled with local security monitoring station 102. If so, then processor 300 may monitor internal sensor 200 and/or external sensor 108 to determine whether either or both sensors have detected a change in status of a door or window, for example, whether a door or window has been opened and/or closed. If processor 300 determines that multi-contact security sensor 100 has not previously been enrolled with one of two, processing continues to the next step.

Figure 5:
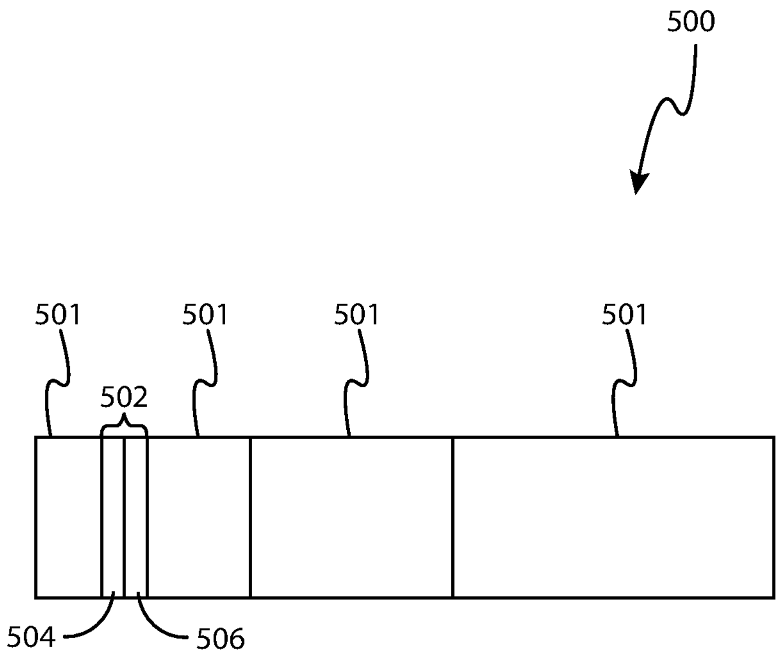
FIG. 5 is a diagram of an enrollment message transmitted by the multi-contact security sensor as shown in FIGS. 1 and 2.
Figure 6:
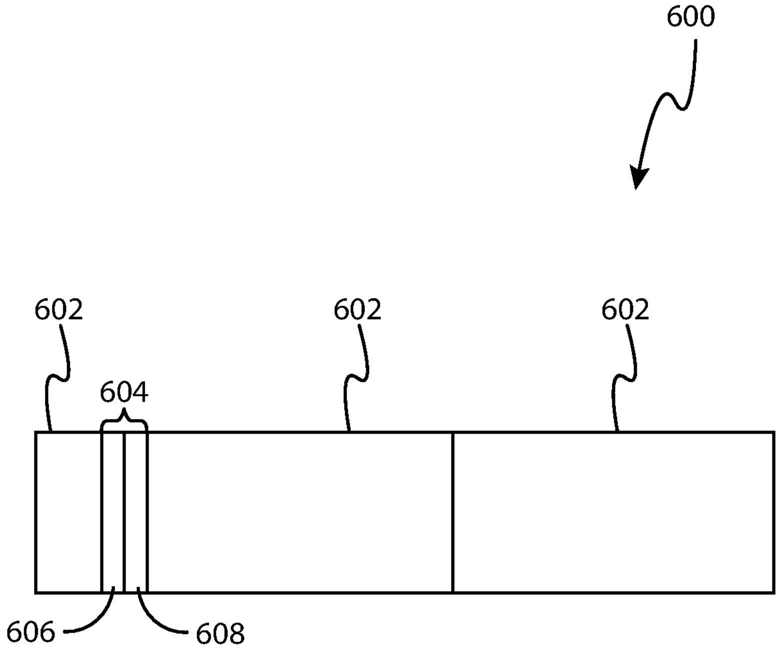
FIG. 6 is a diagram of an event message transmitted by the multi-contact security sensor as shown in FIGS. 1 and 2.

At step 408, after determining that multi-contact security sensor 100 has not previously been enrolled with local security monitoring station 102, processor 300 generates an enrollment message 500, the enrollment message 500 comprising a request to allow multi-contact security sensor 100 to enroll with local security monitoring station 102. As shown in FIG. 5, enrollment message 500 comprises a digital data packet comprising a variety of fields 501, one of which is a status field 502. Status field 502 may comprise two or more status bits, each status bit representing a particular sensor of multi-contact security sensor 100. For example, status bit 504 may be associated with internal sensor 200 while status bit 506 may be associated with external sensor 108. Additional status bits may be used in other embodiments where multi-contact security sensor 100 comprises three or more sensors. The number of status bits in status field 502 is typically determined a priori and embedded within the processor-executable instructions stored in memory 302.

At step 410, in one embodiment, processor 300 may place one or more of the status bits into a particular state, respectively, such as a one or a zero.

At step 412, processor 300 causes transmitter 304 to transmit the enrollment message to local security monitoring station 102.

At step 414, processor 300 may receive an acknowledgment message from local security monitoring station 102 via a receiver coupled to processor 300 or in the event that transmitter 304 additionally comprises a wireless receiver, that the enrollment message was received and/or that multi-contact security sensor 100 was successfully enrolled with local security monitoring station 102, or not. At this point, multi-contact security sensor 100 has been enrolled with local security monitoring station 102 and a user may use multi-contact security sensor 100 with internal sensor 200 only, external sensor 108 only, or use both sensors (i.e., when internal sensor 200 monitors a door or a window, and external sensor 108 monitors a different door or window).

At step 416, the user may place local security monitoring station 102 from the enrollment mode of operation to a normal state of operation where local security monitoring station 102 wirelessly monitors security sensors such as multi-contact security sensor 100 for detection of a door or window being opened.

At step 418, processor 300 detects a change in state of one or both sensors due to a door and/or a window being opened.

At step 420, processor 300 generates an event message 600, indicating that one or both of the sensors have changed state and, thus, that at least one door or one window has been opened. Event message 600 comprises a digital data packet comprising a plurality of fields 602, including status field 604 comprising, in this embodiment, two status bits, status bit 606 and status bit 608. Status bit 606 corresponds to internal sensor 200 while status bit 608 corresponds to external sensor 108. Processor 300 sets or clears the status bits depending on the state of each of the sensors. For example, if processor 300 detected a change of state of internal sensor 200 only, processor 300 would set status bit 606 to a digital 1 and set status bit 608 to a digital 0. If processor 300 detected a change of state of external sensor 108 only, processor 300 would set status bit 606 to a digital 0 and set status bit 608 to a digital 1. If processor 300 determine deadbolt sensors changed state, then processor 300 may set both status bit 606 and status bit 608 each to a digital 1. Setting the status bits by processor 300 allows multi-contact security sensor 100 to inform local security monitoring station 102 which of the two sensors have been triggered.

Figure 7:
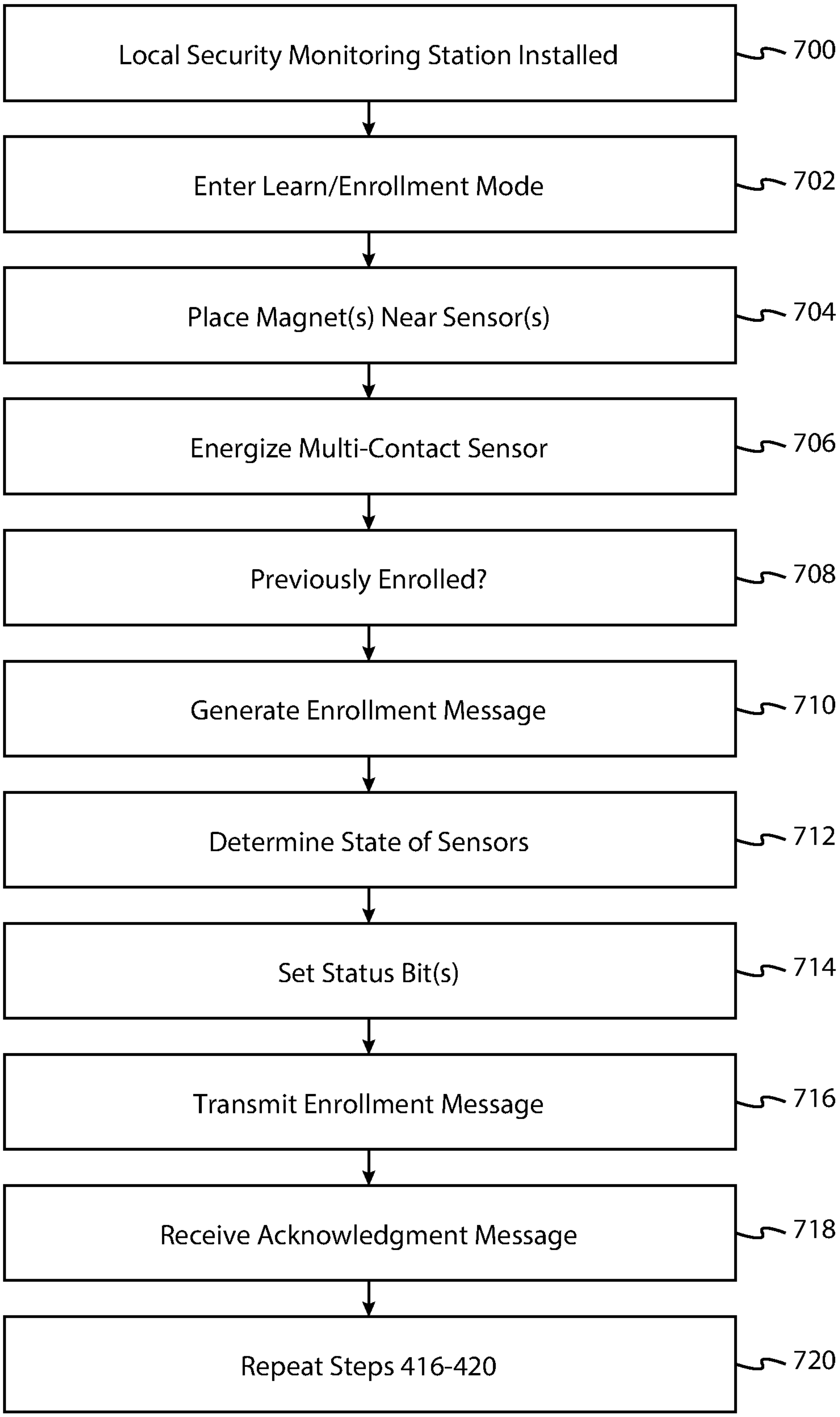
FIG. 7 is a flow diagram illustrating another embodiment of a method performed by the multi-contact security sensor as shown in FIGS. 1 and 2.

FIG. 7 is a flow diagram illustrating another method performed by multi-contact security sensor 100 in a different embodiment then shown in FIG. 7. It should be understood that in some embodiments, not all of the steps shown in FIG. 7 are performed. It should also be understood that the order in which the steps are carried out may be different in other embodiments.

At step 700, local security monitoring station 102 has been previously installed and set up within a premises, such as a home or a business. local security monitoring station 102 is configured to receive wireless event messages and enrollment information from a plurality of sensors that, together with one or two, constitute security system 104.

At step 702, a user places local security monitoring station 102 into a "learn mode" or "enrollment mode", in order to introduce a new security sensor, such as multi-contact security sensor 100. Placing one or two into a learn/enrollment mode as well known in the art.

At step 704, the user may place a small magnet in proximity to either internal sensor 200 or external sensor 108, or both, in order to change the state of one or both sensors.

At step 706, after placing the magnets in proximity to one or both sensors, the user energizes multi-contact security sensor 100, typically by inserting a battery or pulling a tab that connects an already-installed battery inside housing 106 to the circuitry of multi-contact security sensor 100.

At step 708, in response to being energized, processor 300 may determine whether multi-contact security sensor 100 has been previously enrolled with local security monitoring station 102. If so, then processor 300 may monitor internal sensor 200 and/or external sensor 108 to determine whether either or both sensors have detected a change in status of a door or window, for example, whether a door or window has been opened and/or closed. If processor 300 determines that multi-contact security sensor 100 has not previously been enrolled with one of two, processing continues to the next step.

At step 710, after determining that multi-contact security sensor 100 has not previously been enrolled with local security monitoring station 102, processor 300 generates an enrollment message 500, similar or the same to enrollment message 500 as shown in FIG. 5.

At step 712, in one embodiment, processor 300 may determine a state of each sensor by, for example, open or closed depending on whether magnet 112 has been brought in proximity to one or both sensors. For example, if external sensor 108 is not connected to multi-contact security sensor 100 in a use case where only housing 106 and magnet 112 are used to monitor a door or a window, processor 300 detects that internal sensor 200 is in a closed state, while detecting that external sensor 108 is practically in an open state due to the fact that it is disconnected from multi-contact security sensor 100. In another example, if external sensor 108 is connected to multi-contact security sensor 100, and the user places a single magnet 112 in proximity to external sensor 108 only, in a use case where only external sensor 108 will be used, processor 300 may detect that internal sensor 200 is in an open state while external sensor 108 is in a closed state. Finally, if magnet 112 is brought in proximity to both sensors (or separate magnets are brought in proximity to the sensors, respectively), in a use case where both internal sensor 200 and external sensor 108 will monitor separate doors and or windows for example), processor 300 may determine that each sensor is in a closed state. Processor 300 determines a state of each sensor using techniques well-known in the art, such as determining an open or closed circuit associated with a sensor in the case of a reed switch sensor.

At step 714, processor 300 may place one or more of the status bits into a particular state, respectively, such as a one or a zero, depending on a state of one or both sensors. For example, when only internal sensor 200 is used, processor 300 may set status bit 504, representing internal sensor 200, to a digital 1 and set status bit 506, representing external sensor 108, to a digital 1. When only external sensor 108 sensor is used, processor 300 may set status bit 504 to a digital 1. When both sensors will be used, processor 300 may set status bit 504 and status bit 506 both to a digital 1.

At step 716, processor 300 causes transmitter 306 to transmit the enrollment message to local security monitoring station 102.

At step 718, processor 300 may receive an acknowledgment message from local security monitoring station 102 via a receiver coupled to processor 300 or in the event that transmitter 306 additionally comprises a wireless receiver, that the enrollment message was received and/or that multi-contact security sensor 100 was successfully enrolled with local security monitoring station 102, or not. The acknowledgment message may indicate which status bits will be monitored by local security monitoring station 102, based on which status bits were set to a digital one in the enrollment message. At this point, multi-contact security sensor 100 has been enrolled with local security monitoring station 102 and a user may use multi-contact security sensor 100 with internal sensor 200 only, external sensor 108 only, or use both sensors (i.e., when internal sensor 200 monitors a door or a window, and external sensor 108 monitors a different door or window).

At step 720, the method repeats steps 416 through 420, described above with respect to the method of FIG. 4.

Figure 8:
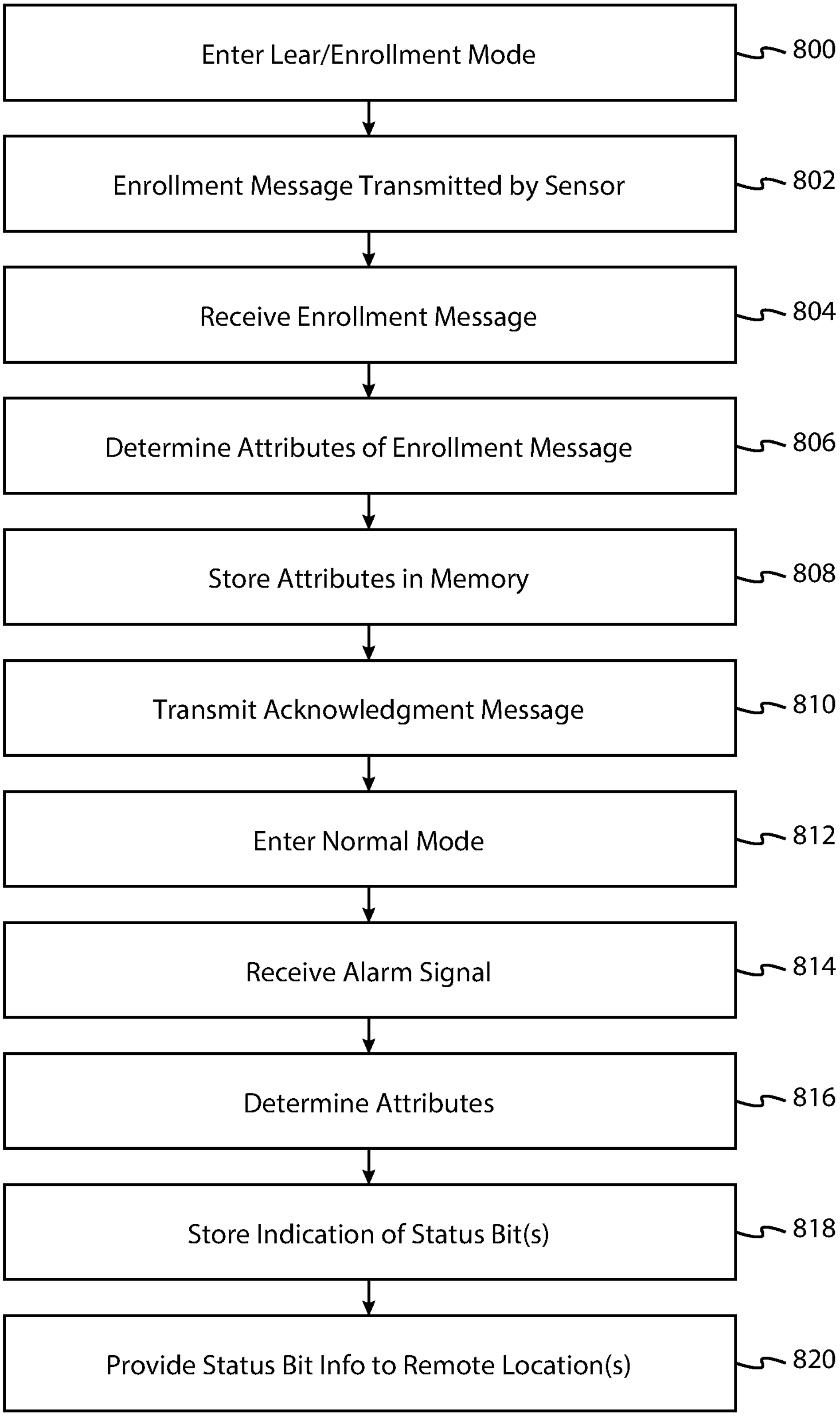
FIG. 8 is a flow diagram illustrating one embodiment of a method performed by the local security monitoring station as shown in FIG. 1 for enrolling t multi-contact security sensor as shown in FIGS. 1 and 2.

FIG. 8 is a flow diagram illustrating one embodiment of a method performed by local security monitoring station 102 for enrolling multi-contact security sensor 100. It should be understood that in some embodiments, not all of the steps shown in FIG. 8 are performed. It should also be understood that the order in which the steps are carried out may be different in other embodiments.

At step 800, a user places local security monitoring station 102 into a "learn mode" or "enrollment mode" as described herein and well-known in the art.

At step 802, multi-contact security sensor 100 transmits enrollment message 500, as described earlier herein.

At step 804, processor 900 receives enrollment message 500 via wireless receiver 904.

At step 806, processor 900 may determine one or more attributes of multi-contact security sensor 100, such as a sensor type (i.e., contact sensor, motion detector, garage door tilt sensor, glass break sensor, etc.), a sensor identification (i.e., a serial number, MAC address, etc.), and a number of sensors associated with multi-contact security sensor 100, determined by the number of status bits contained in enrollment message 500. These attributes may be found in one or more fields 501 and 502 of enrollment message 500. For example, processor 900 may determine that multi-contact security sensor 100 comprises a multi-contact sensor comprising two sensors, based on the presence of two status bits in enrollment message 500, one sensor associated with status bit 504 and another sensor associated with status bit 506.

At step 808, processor 900 may store one or more of the attributes determined above in memory 902 in association with an identification of multi-contact security sensor 100, for example, a serial number of multi-contact security sensor 100.

At step 810, processor 900 may transmit and acknowledgment message to multi-contact security sensor 100, indicating successful reception of enrollment message 500 and/or an acknowledgment that multi-contact security sensor 100 has been successfully enrolled with local security monitoring station 102, or not.

At step 812, the user may place local security monitoring station 102 from the enrollment mode of operation to a normal state of operation where local security monitoring station 102 wirelessly monitors security sensors such as multi-contact security sensor 100 for detection of a door or window being opened.

At step 814, processor 900 may receive event message 600 from multi-contact security sensor 100 via wireless receiver 904 in response to a door or a window being opened and monitored by multi-contact security sensor 100.

At step 816, processor 900 determines one or more attributes of event message 600, such as an identification of a security sensor that transmitted event message 600 and, when the security sensor that transmitted event message 600 is identified as a multi-contact sensor such as multi-contact security sensor 100, processor 900 determines a state of each status bit contained in event message 600. Processor 900 may retrieve the attribute information from memory 902 when event message 600 is received and after processor 900 determines an identification of which security sensor transmitted the event message. Processor 900 may determine how many status bits are present in event message 600 and then determine a state of each status bit. For example, the attribute information associated with multi-contact security sensor 100 may indicate that event messages from multi-contact security sensor 100 should comprise two status bits, and so processor 900 then determines a state of each status bit, i.e., a digital 1 representing a closed position of internal sensor 200 or a digital zero representing an open position of internal sensor 200, a digital 1 representing a closed position of external sensor 108 or a digital zero representing an open position of external sensor 108.

At step 818, processor 900 may store the status of each status bit in memory 902.

At step 820, processor 900 may perform one or more actions based on receipt of event message 600, such as causing one or more audible sirens to sound within a premises being monitored by security system model for, to contact a remote security monitoring center of a potential break in, to contact the user via text message, email or phone, including an indication of which of internal sensor 200 and external sensor 108 was triggered, etc. In one embodiment, an action comprises sending a status message to an external device, such as mobile phone, a security panel, a hub, a gateway, etc., indicating which of the two sensors were triggered. This allows an external device to present an indication of which of internal sensor 200 and external sensor 108 was triggered. For example, the status message may be sent to a hub/gateway inside a structure where sensor 100 is located and forwarded to a remote, third-party computer server via a wide-area network such as the Internet. The status message may then be provided to a hardware device (such as a computer, tablet, a digital home assistant, such as an Apple HomePod, Amazon Alexa, etc.) and/or an app associated with the third-party computer server (such as Apple's Home app, Amazon's Alexa app, Samsung's SmartThings app, etc.). The third-party app may then display a notification that multi-contact security sensor 100 has been triggered, and also an indication of which of internal sensor 200 or external sensor 108 was triggered. The indication is provided even though the third-party app was not explicitly configured by a user to discern whether internal sensor 200 or external sensor 108 was triggered.

The methods or algorithms described in connection with the embodiments disclosed herein may be embodied directly in hardware or embodied in processor-readable instructions executed by a processor. The processor-readable instructions may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components.

Accordingly, an embodiment of the invention may comprise a computer-readable media embodying code or processor-readable instructions to implement the teachings, methods, processes, algorithms, steps and/or functions disclosed herein.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

I claim:

1. A multi-contact sensor, comprising:

a housing having an external communication port adapted to releasably receive a wired connector:

an internal sensor disposed entirely within the housing;

a removable, external contact sensor coupled via the wired connector to the external communication port;

a transmitter;

a non-transient memory for storing processor-executable instructions; and a processor, coupled to the internal sensor, the external communication port, the transmitter and the memory, for executing the processor-executable instructions that cause processor to: in response to a first predetermined event, form an enrollment message comprising a first status bit corresponding to the internal sensor and a second status bit corresponding to the external contact sensor; and transmit the enrollment message to a local security monitoring station for processing.

2. The multi-contact sensor of claim 1, wherein the processor-executable instructions further comprise instructions that causes the processor to: determine that a second predetermined event has occurred based on a signal from either the internal sensor or the external contact sensor; in response for determining that the second predetermined event has occurred, form an event message, the event message comprising an identification of the multi-contact sensor and the first bit represents a current status of the internal sensor and the second bit represents a current status of the external contact sensor; and transmit the event message to the local security monitor.

3. The multi-contact sensor of claim 2, wherein the second predetermined event is a door or a window being opened, wherein the processor-executable instructions further comprise instructions that causes the processor to: receive the signal from the internal sensor indicative of the door or the window being opened; in response to receiving the signal, generate the event message, the event message comprising the identification, the first bit and the second bit, wherein the first bit is set and the second bit is unset.

4. The multi-contact sensor of claim 2, wherein the second predetermined event is a door or a window being opened, wherein the processor-executable instructions further comprise instructions that causes the processor to: receive the signal from the external contact sensor indicative of the door or the window being opened; in response to receiving the signal, generate the event message, the event message comprising the identification, the first bit and the second bit, wherein the first bit is unset and the second bit is set.

5. The multi-contact sensor of claim 1, wherein the first predetermined event comprises a sensed powering of the multi-contact sensor.

6. The multi-contact sensor of claim 1, wherein the internal sensor senses a magnetic field.

* * * * *